Sept. 2, 1969     I. A. LYND     3,464,124
PHONOGRAM TEACHING DEVICE
Filed July 14, 1967
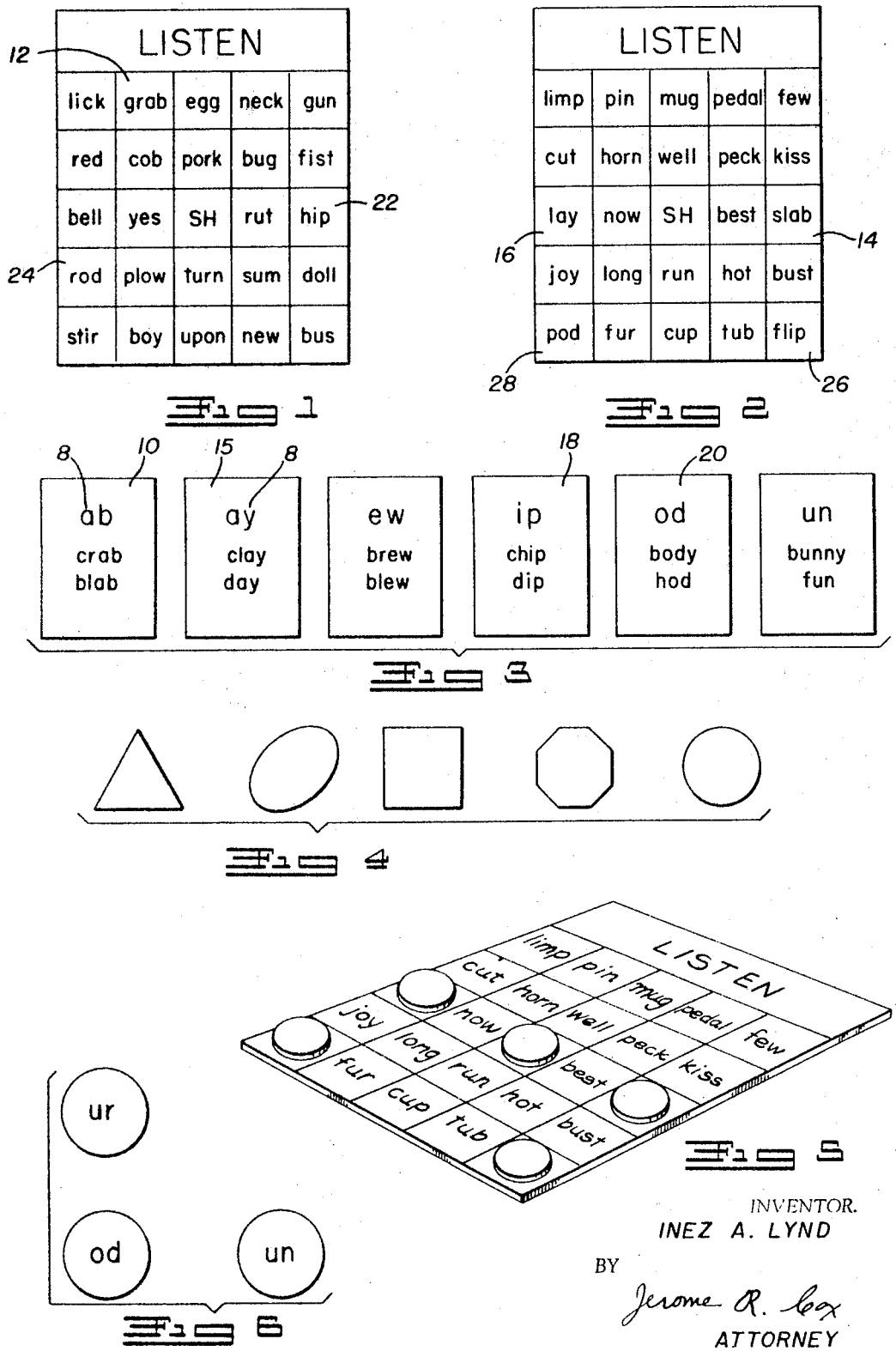
INVENTOR.
INEZ A. LYND
BY Jerome R. Cox
ATTORNEY

United States Patent Office

3,464,124
Patented Sept. 2, 1969

3,464,124
PHONOGRAM TEACHING DEVICE
Inez A. Lynd, Ironton, Ohio, assignor to Wayne Lynd, trustee, Ironton, Ohio
Filed July 14, 1967, Ser. No. 653,524
Int. Cl. G09b 19/04; A63f 3/00
U.S. Cl. 35—35                                              1 Claim

ABSTRACT OF THE DISCLOSURE

A teaching device is shown having a square playing board for each player which has adjoining square spaces, each space with a word in it, and all of the spaces covering the board; having a deck of phonogram cards, each having a phonogram on it; and having several sets of markers for positioning on the proper playing board spaces in response to the sequential drawing of the phonogram cards and pronunciation of the phonograms thereon.

BACKGROUND OF THE INVENTION

Children, who are learning to read, often have difficulty pronouncing words which they see in print. Because words are built of various combinations of sounds, children are taught to recognize, within each word, those letter combinations denoting common sounds. So, for example, upon seeing the word "happy," the child should recognize the sound indicated by "ap." The same sound occurs in "snap," "nap," and many other words.

Such sounds, used to build words, are called phonograms. Each phonogram may be indicated using its alphabetical notation or by other symbolism.

There is a need for a game to entertain pupils and to provide practice in recognizing and identifying the phonograms making up the words they see.

Other inventors have provided games in which several playing boards are provided, each having spaces with indicia therein. "Bingo" and "Lotto" are typical.

These games, however, could not be adequately adopted to provide the exercise and practice my invention provides. There are far more phonograms used in words than there are columns on the "Bingo" type playing board. To give maximum benefit, the player should be forced to scan all the playing spaces rather than a single column or row of spaces as one does in Bingo. More importantly, to provide the desirable experience, the indicia which each player searches for as he scans his playing board should not be isolated by themselves in a space, but rather should be with other indicia to force the player to recognize the indicia being searched for when they are a part of a word.

It is therefore an object of my invention to provide an improved entertainment and teaching device.

Another object of my invention is to provide a teaching device which requires a child to scan several words to pick out the desired phonogram in response to unpredictably sequentially pronounced phonograms.

Another object of my invention is to provide a teaching device in which marker indicia correspond to the phonograms being learned.

Further objects and features of my invention will be apparent from the following specification and claims when considered in connection with the accompanying drawings illustrating several embodiments of my invention.

SUMMARY OF THE INVENTION

I have found that the foregoing and other objects may be attained in a teaching device comprising: (a) a plurality of phonogram cards, each having a different phonogram; (b) a plurality of playing boards, each having several spaces with words in each space made up of at least one phonogram; and (c) a plurality of markers for positioning on the spaces.

BRIEF DESCRIPTION OF THE DRAWINGS

FIG. 1 is a plan view of a playing board which is a part of a teaching device constructed according to my invention.

FIG. 2 is a plan view of another plaing board which is a part of a teaching device constructed according to my invention.

FIG. 3 is a plan view of several phonogram cards which are a part of a teaching device constructed according to my invention.

FIG. 4 is a plan view of alternate shapes for markers which are a part of a teaching device constructed according to my invention.

FIG. 5 is a view in perspective of the game board of FIG. 2 with properly positioned markers which are of the preferred shape.

FIG. 6 is a plan view of an alternative form of the markers which are a part of a teaching device constructed according to my invention.

In describing the preferred embodiment of the invention illustrated in the drawings, specific terminology will be resorted to for the sake of clarity. However, it is not intended to be limited to the specific terms so selected, and it is to be understood that each specific term includes all technical equivalents which operate in a similar manner to accomplish a similar purpose.

DETAILED DESCRIPTION

*Structure.*—Words may be classified according to the phonograms they contain. A word is a member of a phonogram class if it contains the phonogram denoting the class. Some words are members of several phonogram classes because they contain several phonograms.

My game apparatus has at least one game board, as shown in FIG. 1 and FIG. 2, for each player. I prefer that the boards be different so that the child may learn a wide variety of phonograms, although this is not essential. Each board has several spaces which are square in the embodiments of FIG. 1 and FIG. 2. Within each space are word indicia which form word members of phonogram classes.

I prefer that each playing board contain only one member of any phonogram class although this it not essential. Obviously, several phonogram classes will not be represented on each playing board because there are so many classes. Furthermore, I prefer also that any single word appear on only one playing board although the game can be used otherwise. Such an arrangement allows each card to provide entirely new exercises.

In FIG. 3, I show six phonogram cards which are a part of my teaching device. These cards may be the size of ordinary playing cards or larger, but I prefer that they be smaller, as for example 1" x 1½". Each card shown has phonogram indicia 8 indicating different phonograms. I prefer to use many more cards and phonograms than shown. Thus each card represents a phonogram class. Although the indicia shown and preferred are purely alphabetical, symbolic indicia could also be used.

On each phonogram card, I also show two members of the same phonogram class which the card represents. These are optional and serve as examples. I do not prefer this becasue the teacher should offer a wide variety of example words if the game is to be effective. If the examples are on the card, she is apt to use these over and over. As the children progress, longer words should be used as examples in order to enlarge the children's vocabulary.

The third part of my teaching device is a plurality of markers which are divided into sets. There are at least as many sets of markers as there are players. Each set should be identical. I prefer to use sets of markers in which all the markers are circular, as shown in FIG. 5. However, each set of markers could contain markers of various shapes, as shown in FIG. 4. Each shape could indicate a phonogram. As another alternative, each shape could correspond to a vowel.

Alternatively, each set of markers could have different phonogram indicia on each marker of the set. Three such markers are shown as examples in FIG. 6. As another alternative, each marker in a set could be differently colored.

*Operation.*—While there are other obvious methods of using my teaching device, I will describe the method and rules I prefer.

Each player is given a playing board and a set of markers. So, for example, players one and two may get the boards shown in FIG. 1 and FIG. 2 respectively, and also each gets a set of markers.

The teacher makes a deck of the phonogram cards, including those in FIG. 3.

To begin, a "free" marker is placed over the center space of each playing board having an "SH" in it.

The teacher now sequentially draws phonogram cards from the deck. The phonogram on each card is pronounced and, if desired, the two examples may be read. I prefer that at least one example be said. The best results are obtained if the teacher writes the phonogram on the chalk board as it is spoken. All players scan every space on their playing boards in search of a word having the pronounced phonogram. Each player who finds one, places a marker on it.

For example, the first card 10 drawn may be "ab," in which case player one places a marker on the space 12 having "grab;" and player two, on the space 14 having "slab." The second card 15 might be "ay." Player one does not have a word in that phonogram class, but player two can cover the space 16 having "lay." The third card 18 and fourth card 20 might be "ip" and "od," so that player one would cover the space 22 having "hip" and the space 24 having "rod," while the second player would cover the space 26 having "flip" and the space 28 having "pod."

In FIG. 5, I show the board of player two with the markers in place corresponding to this example sequence of cards.

As an alternative, the players could use markers with indicia, such as shown in FIG. 6, and be required to first choose the marker with the pronounced phonogram and then place it on the proper place on his playing board. As another alternative, instead of indicia, the choice could be of shapes or colors.

It is to be understood that while the detailed drawings and specific examples given describe preferred embodiments of my invention, they are for the purposes of illustration only, that the apparatus of the invention is not limited to the precise details and conditions disclosed, and that various changes may be made therein without departing from the spirit of the invention which is defined by the following claim.

I claim:

1. A teaching device for entertainment and for practicing the skill of identifying phonograms in words, comprising:
    (a) a plurality of phonogram cards, each card having a different phonogram indicium thereon indicating a phonogram class of words, each phoongram having fewer letters than each word of the phonogram class;
    (b) a plurality of playing boards, each board having a plurality of spaces with word indicia therein, each word including a portion corresponding to one of the phonograms and being a member of the phonogram class corresponding to said phonogram wherein each word indicium in each space is different from the word indicia on every other space of every other playing board; and
    (c) a plurality of markers for positioning on said spaces in response to phonogram indicia on sequentially drawn phonogram cards;

wherein the markers comprise a plurality of identical sets of markers, each marker of every set having a color and shape combination corresponding to a different phonogram indicium.

References Cited

FOREIGN PATENTS 491,948  4/1953  Canada.

EUGENE R. CAPOZIO, Primary Examiner

W. H. GRIEB, Assistant Examiner